United States Patent

[11] 3,623,004

[72] Inventor John W. Irwin
Longmont, Colo.

[21] Appl. No. 16,871
[22] Filed Mar. 5, 1970
[45] Patented Nov. 23, 1971
[73] Assignee International Business Machines Corporation
Armonk, N.Y.

[54] BUFFERING AND TRANSFERRING SIGNALS
5 Claims, 3 Drawing Figs.

[52] U.S. Cl. ........ 340/172.5
[51] Int. Cl. ........ G11b 13/00
[50] Field of Search ........ 340/172.5

[56] References Cited

UNITED STATES PATENTS

| | | | |
|---|---|---|---|
| 2,921,296 | 1/1960 | Floros | 340/172.5 |
| 3,421,147 | 1/1969 | Burton | 340/172.5 |
| 3,417,377 | 12/1968 | Vietor et al. | 340/172.5 |

OTHER REFERENCES

Deskewing System, IBM Technical Disclosure Bulletin, Vol. 11 No. 11 April 1969 p. 1424.

*Primary Examiner*—Gareth D. Shaw
*Assistant Examiner*—R. F. Chapuran
*Attorneys*—Hanifin and Jancin and Herbert F. Somermeyer

ABSTRACT: U.S. Pat. No. 2,921,296 discloses a deskewing system usable to transfer signals from a magnetic tape to a byte-oriented data-processing system. The present disclosure teaches that buffering efficiency can be improved by providing dual output counters, as opposed to the output counter (ROC) 100 in the above-cited patent. Byte assembly count (BAC) tallies the number of assembled input bytes to be transferred to the byte-oriented system. A byte output counter (BOC) tallies the number of bytes that have been transferred to the byte-oriented system. Comparison between the tallies in BAC and BOC causes bytes to be transferred to the byte-oriented system. This arrangement uses the deskewing buffers as byte-oriented buffers.

INVENTOR
JOHN W. IRWIN
BY Herbert F. Somermeyer
ATTORNEY

BUFFERING AND TRANSFERRING SIGNALS

BACKGROUND OF THE INVENTION

The present invention relates to digital data transfer means and, more particularly, to a deskewing-buffering apparatus adaptable to be used with a magnetic tape system.

Present day skew buffering systems utilize a plurality of stages of buffering between the skew buffer output (SKB) and a byte-oriented system which is to receive the assembled bytes of data signals. The data rate from the magnetic media controls the byte transfer rate to the byte-oriented system. This is determined by the trailing track read-in counter (RIC) used in SKB. When the most trailing or lagging track or tracks have stepped ahead of a readout counter (ROC), assembled bytes of data are then transferred to the byte-oriented system at the maximum transfer rate from SKB. In some instances, the byte-oriented system may be incapable of receiving assembled bytes of data at the maximum SKB transfer rate. This situation occurs when the most lagging track is just being deadtracked. In this situation, data is accumulated in SKB. Upon the detection and indication that the most lagging track is deadtracked, data then accumulated in SKB is fed to the byte-oriented receiver at maximum clock rate. In many instances this transfer rate is much higher than that normally encountered in readout from the magnetic tape, for example. When data signals are transferred to the byte-oriented system faster than it can accept them, some of the data bytes are obliterated, resulting in an "overrun situation."

When byte-oriented systems are attached to magnetic tape units and the like having minimum data transfer rates, it is a necessity that channel buffering be provided. For example, in a byte-oriented system, a delay in transfer of acceptance of data bytes may occur at storage boundaries. Also, the byte-oriented system may be involved in data chaining, which can cause momentary lapses in response of the byte-oriented system to the receipt of data bytes. Also, some of the byte-oriented systems are designed to be lower performance systems and, therefore, are designed to accept bytes at a maximum rate which may be less than the maximum or dump rate from SKB. In this situation, additional buffering will enable lower performance units to be easily and reliably attached to communication and magnetic tape systems.

SUMMARY OF THE INVENTION

It is an object of the present invention to improve deskewing apparatus such as to reduce the tendency of overrun.

It is another object to provide an improved method and apparatus for the definition and detection of overrun.

In accordance with the present invention, a known deskewing apparatus (SKB) is connected through a data channel to a byte-oriented system. Transfer of assembled bytes of data is under the control of two counters. The first counter has a tally of assembled bytes of data in SKB. The second counter has a tally of bytes that have been transferred through the channel to the byte-oriented system. When the channel or other signal transfer means provides a ready signal indicating that it can accept another byte of data, and the first counter has a count greater than the second counter, a byte of data is transferred. SKB now can buffer several fully assembled bytes.

In SKB, a plurality of input signals from various tracks of magnetic tape, for example, may arrive at different times. This is called skew. A read-in counter (RIC) for each of the tracks tallies the number of signals read from the tracks with the count indicating the relative position of the signals on the tracks. If there is too great a difference between the various RIC tallies, then there is an excessive skew; that is, SKB is incapable of handling the amount of skew between the input signals. This is called a skew check. An overrun check occurs when the value of the byte output counter (BOC) has a predetermined relationship to the leading one of the RIC's. If any RIC has stepped too far ahead of BOC, the buffering system is incapable of holding all of the assembled bytes of data for the byte-oriented system. This is overrun.

The foregoing and other objects, features, and advantages of the invention will be apparent from the following more particular description of preferred embodiments of the invention, as illustrated in the accompanying drawings.

DETAILED DESCRIPTION

Figure 1:
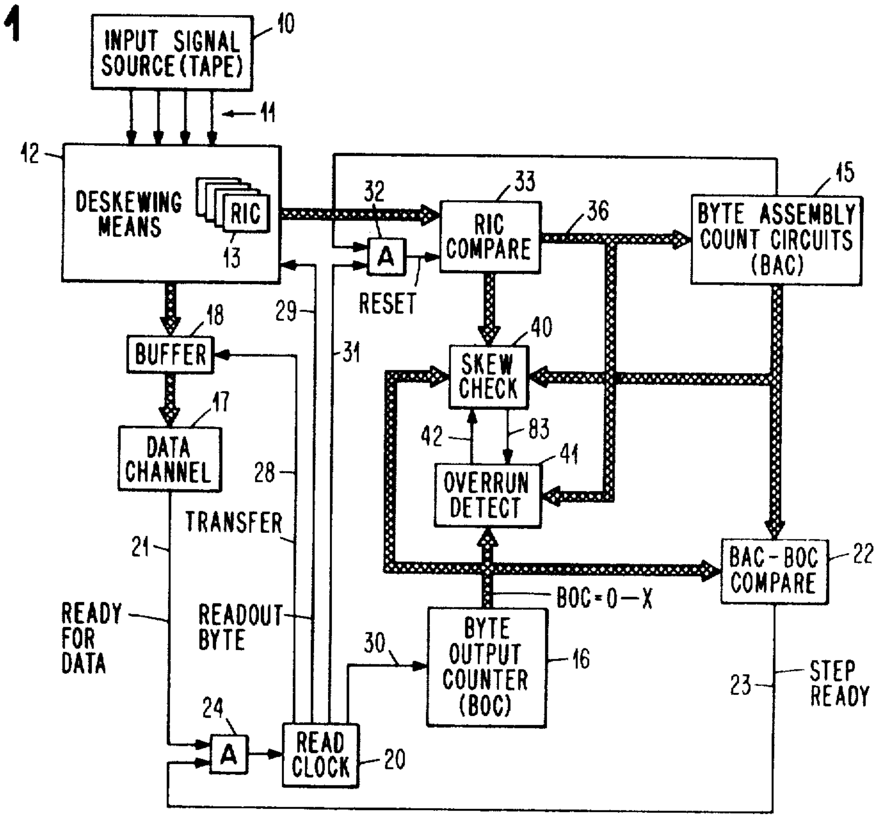
FIG. 1 is a simplified block diagram of a data transfer system incorporating the teachings of the present invention.

Like numbers indicate like parts and structural features in the various drawings. The present invention is explained with respect to a magnetic tape environment with no limitation thereto being intended. The magnetic tape readback system is represented in FIG. 1 as input signal source 10. As shown, it supplies signals from four tracks, represented by arrows 11, which may provide signals from the same byte of data at different times. Deskewing means (SKB) 12 is constructed as shown in U.S. Pat. No. 2,921,296, having a plurality of read-in counters (RIC) 13. The readout counter of deskewing means 12 is dispensed with and, as a substitute in the present system, byte assembly count circuits (BAC) 15 are provided. A second counter, byte output counter (BOC) 16, tallies the number of bytes transferred from SKB 12 to byte-oriented data channel 17 via buffer registers 18. Transfers of signals into SKB 12 is under control of input signal source 10; that is, SKB 12 must accept all signals as they come from source 10 irrespective of the timing relationships. Transfer signal from SKB 12 to data channel 17 is under control of read clock 20.

Read clock 20 is activated to provide one set of control signals each time data channel 17 provides a ready-for-data signal over line 21 and BAC–BOC compare 22 provides a step ready signal over line 23. AND circuit 24 is jointly responsive to the last two mentioned signals to provide an actuating signal to read clock 20. The step ready signal indicates that BOC 16 has a value less than BAC 15; that is, the number of bytes assembled in SKB 12 exceeds the number of bytes transferred to data channel 17. Therefore, there is at least one byte ready to be transferred.

Upon actuation, read clock 20 supplies a first signal over line 28 to transfer data signals from buffer registers 18 to data channel 17. This clears at least one buffer register 18 for receiving a byte of data from SKB 12. A second signal is then supplied over line 29 to transfer one byte of data signals from SKB 12 to buffer registers 18. The byte transferred is the oldest byte assembled in SKB 12 and is usually determined by the tally in BOC 16. In this regard, the tally in BOC 16 is used in the same manner as the readout counter in the above-cited patent.

After the bytes of data have been transferred as above described, BOC 16 is incremented by a signal supplied over line 30. Then, as the last step in the read clock cycle, a pulse supplied over line 31 samples AND-gate 32 to determine whether or not BAC 15 is in a reference state, such as at zero. If so, a read pulse is supplied to RIC compare circuit 33 as will be later explained. Upon resetting RIC compare 33, read clock 20 stays in a quiescent state until again activated by AND circuit 24.

Data channel 17 will not receive data at a rate faster than it can accept it. However, SKB 12 must receive data signals from source 10 at its designed rate. Therefore, if data channel 17 is nonresponsive, a number of signals can be supplied from source 10 into SKB 12 greater than the number of buffer registers contained therein. This causes obliteration of bytes of data within SKB 12, which is an overrun check situation; that is, a byte of data is inserted into a register which still contains a byte. This insertion destroys the original byte.

RIC compare circuit 33 compares the tallies of all RIC's 13. When all of the RIC's have passed a certain count (such as 1, 2, or 3), a signal is supplied over cable 36 to BAC 15, indicating the registers in SKB 12 have assembled another byte of data. BAC 15 then supplies a signal indicating that byte is available in SKB 12. This signal is maintained until that byte is transferred to buffer registers 18, as will become apparent.

Figure 3:
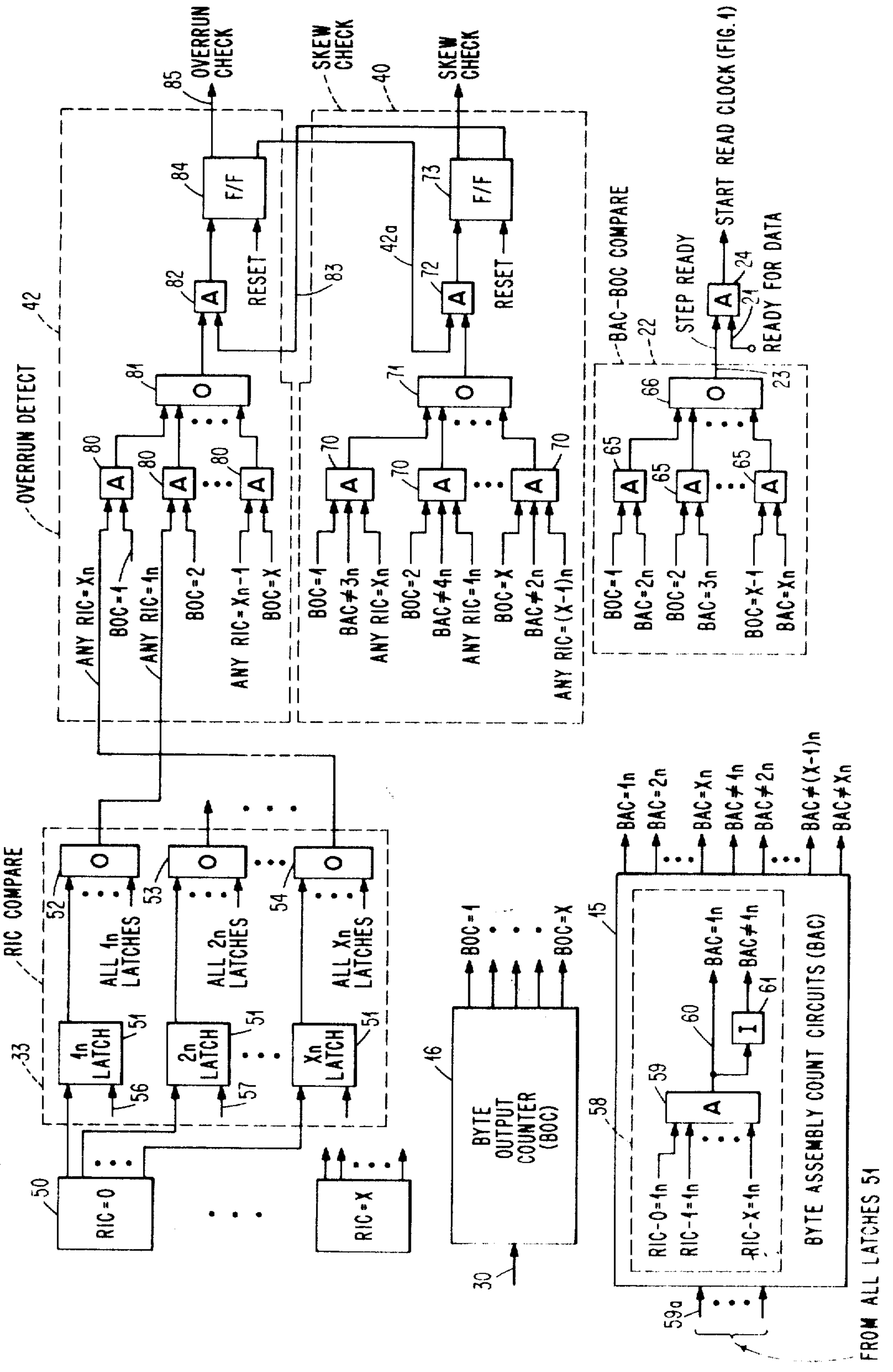
FIG. 3 is a simplified, but detailed, signal flow diagram used to provide a more detailed understanding of the FIG. 1 illustration.

Skew check circuit 40 is jointly responsive to the leading RIC (that is, the RIC with the highest tally or most advanced tally), the byte assembly count, and the byte output count to indicate a skew check, as fully explained with respect to FIG. 3. In a similar manner, overrun detect circuit 41 is jointly responsive to the tally in BOC 16 and to predetermined numerical tallies in a RIC 13 with the leading or most advanced tally, as indicated by RIC compare 33, to indicate an overrun check situation. Skew check circuit 40 and overrun detect circuit 41 are interlocked, such that there can never be a skew check and an overrun check at the same time.

Figure 2:
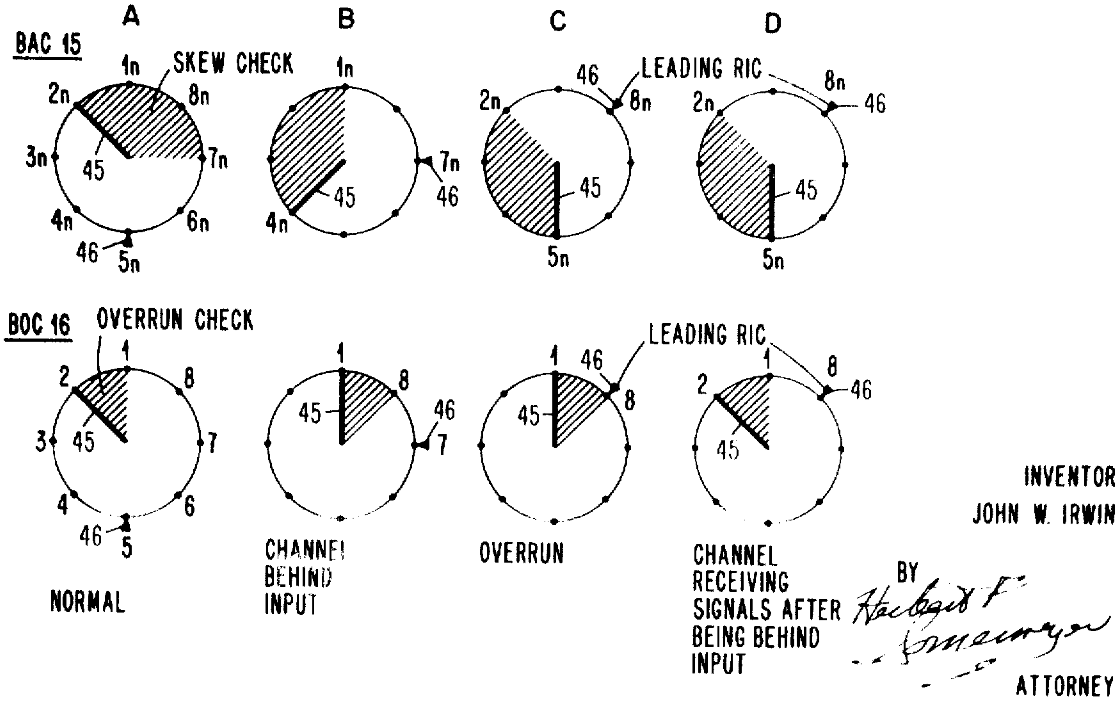
FIG. 2 is a graphical representation of the relationship between counts in BAC, BOC, and the most leading RIC for indicating skew checks and overrun checks.

A clearer understanding of a skew check and an overrun check is obtained by referring to the graph in FIG. 2. Shown is an eight-register deskewing means having positions 1 through 8. In some systems, a byte of data may consist of several subbytes. For this reason, in the four circles indicating BAC 15 counts, the numbers are $1n$ through $8n$ where "$n$" is any integer greater than zero. In the simplest case, $n$ equals 1, wherein one byte of data occupies one deskewing register in SKB 12. In other situations, $n$ may have a value of four, wherein one byte of data occupies four registers in SKB 12. Data channel 17, on the other hand, is designed to operate with one byte of data. Therefore, BOC 16 counts 1 through 8. The tally in BAC 15 or BOC 16 circuits is represented by solid lines 45 with the vertical columns A through D indicating a count in BAC or BOC at given instants of time.

Both BAC 15 and BOC 16 count in a counterclockwise direction. The hatched areas trailing each of the counts indicated by the lines 45 indicate a skew check and overrun check condition, respectively, when the leading RIC has a count residing in the shaded area. The leading RIC counts are indicated by the heavy carets 46. Column A illustrates a BAC–BOC relationship which is found in normal operation. That is, data channel 17 is accepting bytes of data as fast as SKB 12 assembles them. This is indicated by BOC 16 count equaling BAC 15 count. In the present illustration, maximum skew that is compensible by SKB 12 is five. This means that, if the leading RIC is more than five positions ahead of BAC 15, a skew check is indicated. On the other hand, an overrun check has a maximum of seven positions; that is, the number of skew buffers less one. These values will change in accordance with design choices made in a system.

Columns B and C represent a situation wherein data channel 17 is not accepting assembled bytes of data. In column B, BAC 15 has a value of four while BOC 16 has a value of one. This indicates that the channel is four bytes of data behind SKB 12. The leading RIC has a count of seven and is approaching overrun check condition; i.e., the hotbed area. In column C, leading RIC has a count of eight and is impinging upon the shaded area in BOC 16, indicating that overrun check has occurred. That is, data signals have been written into SKB register 8 before the previously assembled byte had been transferred from buffer register 1. Simultaneously, BAC 15 has advanced to position $5n$, indicating yet another byte has been assembled.

Column D shows a situation similar to column C, except that data channel 17 has accepted one byte of data before the leading RIC has advanced to position 8. At this time, BOC 16 has advanced to position 2, preventing an overrun check. From inspection of FIG. 2, it is seen that the dual counter concept in transferring of assembled bytes of data to a byte-oriented data channel 17 enables the sharing of SKB 12 buffer registers with the data channel, such that a greater buffering capacity is provided with the same number of registers as that provided in prior deskewing apparatus.

Referring now to FIG. 3, some detailed circuitry is shown which is usable to implement the FIG. 1 illustration. A plurality of RIC's 50 in SKB 12 supply their tallies 1 through 8 to be captured by a set of latches 51 in RIC compare circuits 33. FIG. 3 shows $x$ RIC's, which corresponds to 8 in FIG. 2. Throughout FIG. 3, the character "$x$" indicates the highest numbered track of source 10. Circuits associated with intermediate number tracks (i.e., 3 through $x$–1) are omitted for clarity. In RIC compare circuit 33, the RIC counts are all captured in the respective latches 51. There is one set of "$x$" latches 51 for each RIC. A plurality of OR circuits 52, 53, and 54 receives signals from latches 51. OR circuit 52 receives input from all $1n$ latches respectively associated with RIC $o$ through RIC $x$. A $1n$ latch being set represents that the corresponding RIC has a tally of one. There is one $1n$ latch for each RIC. Therefore, OR circuit 52 output signal indicates that any RIC ($O$–$x$) has passed a count of one. That is, the leading RIC's 1n latch causes OR circuit 52 to supply its signal. In a similar manner, OR circuit 53 receives the output signals from all $2n$ latches. There is one $2n$ latch for each RIC. The output signal of OR circuit 52 to 54, respectively, indicates that any RIC had a value of $1n$, $2n$, etc., through $xn$.

It is noted that, as latches 51 are set by the respective RIC's, the RIC value will be maintained indefinitely unless the respective latches are reset. The pattern of set latches is an image of all skew buffer positions containing assembled bytes. Since BOC 16 tallies the bytes that are sent to data channel 17, the corresponding count in BOC 16 is gated by a pulse from read clock 20 to reset the respective latch. For example, when BOC 16 has a value two, the assembled byte in register $1n$ of deskewing means 12 has been transferred to data channel 17. At this time, therefore, $1n$ latches 51 can be reset. Accordingly, a reset signal supplied over line 56 by an AND circuit (not shown) jointly enabled by read clock 20 and BOC 16 equals 2. In a similar manner, $2n$ latch 51 is reset by a signal on line 57 by BOC 16 equals 3 and the read clock 20. Generally speaking, each of the latches 51 is reset by BOC 16 having a count one greater than the value indicated in the latch.

BAC 15 consists of a plurality of decoding circuits 58; one circuit 58 for each register in SKB 12. In the present illustration, BAC 15 has eight decoding circuits 58, only one of which is shown in schematic form. The input to BAC 15 is from all latches 51 in RIC compare circuit 33. This is indicated diagrammatically by the arrows 59$a$. In the present illustration, with four tracks there are four RIC's 13 with eight positions each. There are 32 latches 51 with 32 inputs to BAC 15. The illustrated circuit 58 decodes the $1n$ counts. It receives the $1n$ counts from all of the $1n$ latches 51 RIC $O$ through RIC $K$, where $K$ is the number of tracks in source 10, or 4. AND circuit 59 is responsive to $1n$ count in each of the RIC's to indicate that a byte of data has been assembled in the $1n$ register position of SKB 12. This is indicated by a DC activating signal supplied over line 60. Inverter 61 inverts the signal to supply a DC activating signal indicating that BAC 15 does not equal $1n$; that is, a complete byte does not reside in SKB 12 register $1\ n$. This signal indicates the position of the most lagging RIC and is used in skew check circuit 40 as later explained.

BOC 16 can be a straight binary counter which is incremented by the pulse on line 30 from read clock 20. It can supply BOC=1 to BOC=$x$ signal from the respective digit position in the counter. In this instance, it could be a ring counter of known design.

BAC–BOC compare circuit 22 determines whether or not the count in BAC 15 is greater than the count in BOC 16. This is determined by a set of AND circuits 65 which supply their respective output signals to OR circuit 66 to form the step ready signal on line 23. It should be pointed out herein that BAC count may simultaneously indicate a plurality of counts. For example, if five bytes of data had been assembled in SKB 12 in positions 1 through 5, then BAC 15 would indicate $1n$, $2n$, $3n$, $4n$, and $5n$. BOC 16 indicates the number of the registers from which the last byte of data was transferred to data channel 17. This may equal the last byte assembled in SKB 12.

If such is the case, data channel 17 has received all of the assembled bytes. However, if any byte has been assembled that has not been transferred, BAC 15 indicates a tally at least one greater than the present tally in BOC 16. Accordingly, to detect when a byte may be transferred, AND circuits 65 respectively receive the indicating signals from BOC 16 and the next higher count from BAC 15. For example, BOC=1 line is connected to a first AND circuit 65, which also receives a signal when BAC=2*n* to indicate that a byte of data is ready to be transferred from register 2*n*, and so forth.

Skew check circuit 40 detects and indicates excessive skew; that is, when the leading RIC has counted to the shaded area in the BAC 15 count circles of FIG. 2. Excessive skew detection is accomplished by a set of AND circuits 70, each of which receives an input from a RIC, BOC, and BAC, indicating the excessive skew relationship illustrated in FIG. 2. The outputs of the AND circuits 70 are supplied through OR circuit 71 to partially activate AND-circuit 72. Interclock signal from overrun detect circuit 41 is supplied over line 42*a* to enable AND circuit 72 for setting skew-check flip-flop 73. Flip-flop 73 being set indicates skew check. Maximum skew must be detectable for each permissible count in BAC 15; for example, in the first AND circuit 70, the BAC 3*n* signal indicates the count of the most trailing or lagging RIC. This corresponds to the heavy line in FIG. 2. This means that all of the RIC's have not passed 3*n* count. The BOC=1 signal indicates that a byte of data has been transferred from the 1*n* register, making that register available for receiving more signals. However, register 2*n* is not available at this time. The most leading RIC is indicated by "any RIC=*xn*" (in the present illustration, *x*=8), which is the lowest count RIC in the skew check area of FIG. 2. This, of course, indicates that at least one RIC is in the shaded area. There may be more, but such detection is not necessary for indicating a skew check. The other AND circuits 70 detect excessive skew in a similar manner for the respective permissible BAC 15 counts.

Overrun detect circuit 42 operates in a similar manner. A plurality of AND circuits 80 detects the relationship between the most leading RIC and BOC 16. Referring to a first and circuit 80 and column C of FIG. 2, it is seen that when any RIC equals the value of *xn* (which is 8 in the illustration) and BOC 16 has a count of 1, overrun check is indicated. Note that latches 51 maintain the RIC count, even though the RIC has stepped to another count. It is imperative in this system that the RIC count be maintained for at least one count cycle of SKB 12. Any AND circuit 80 being activated by the indicated inputs supplies a pulse through OR circuit 81 to sample AND circuit 82. Skew check flip-flop 73 being reset (that is, there is no skew check) supplies an AND circuit enabling signal over line 83 to enable AND-circuit 82 to pass the overrun check signal to set overrun check flip-flop 84. Overrun check is indicated by an indicating signal on line 85. Overrun flip-flop 84 being reset supplies an AND circuit enabling signal over line 42*a* to AND circuit 72 of skew check circuit 40. The overrun check and skew check signals are supplied to a control unit (not shown) which then may enter a diagnostic routine for determining what action to take.

While the invention has been particularly shown and described with reference to preferred embodiments thereof, it will be understood by those skilled in the art that various changes in form and details may be made therein without departing from the spirit and scope of the invention.

What is claimed is:

1. A data transfer system including in combination:
deskewing means for asynchronously receiving a plurality of data signals and for assembling same into bytes nd having RIC means tallying received signals;
byte assembly count means (BAC) responsive to said RIC means for counting in accordance with said tallying;
data channel means for receiving bytes of data and having control means indicating that data may be received;
byte output counter means (BOC) for tallying bytes of data transferred to said data channel means;
read clock means jointly responsive to said BAC having a count greater than said BOC and to said signal from said control means for initiating transfer of data signals from said deskewing means to said channel means.

2. Apparatus as set forth in claim 1, wherein said RIC means, BAC, and BOC have an identical modulus and further including:
assembled byte overrun detecting means jointly responsive to said BAC indicating a first count and any one of said RIC means having a count a predetermined small number of positions from said first count.

3. Apparatus as set forth in claim 1, wherein said RIC means, BAC, and BOC repeatedly count through a given modulus as data signals are transferred; and
RIC compare means indicating within said given modulus of said BOC count that any RIC means has counted through a given count irrespective of the present count in any said RIC means for indicating a leading RIC count.

4. Apparatus as set forth in claim 3, including malfunction checking means jointly responsive to said RIC compare means, said BAC and BOC having predetermined different count indications to indicate a single check condition, but capable of detecting a plurality of different check conditions.

5. Apparatus as set forth in claim 3, wherein said BAC comprises a plurality of decoding circuits, each decoding circuit being responsive to said RIC compare means indications to indicate that within said given modulus all of said RIC means have counted through predetermined counts for indicating that bytes of data have been assembled in said deskewing means, a plurality of assembled bytes being indicatable at any given instant.

* * * * *